United States Patent
Bell

[11] 3,739,692
[45] June 19, 1973

[54] SWASHPLATE AND LIKE HYDRAULIC MACHINES

[75] Inventor: George V. Bell, Ponteland, Northumberland, England

[73] Assignee: Reyrolle Hydraulics Limited, Hebburn, England

[22] Filed: Sept. 6, 1968

[21] Appl. No.: 757,985

[52] U.S. Cl. ................................................ 91/506
[51] Int. Cl. ............................................. F01b 13/04
[58] Field of Search ............ 103/162, 162 A, 162 B, 103/173; 230/177; 92/57; 91/198, 200, 504–506; 417/269, 270

[56] References Cited
UNITED STATES PATENTS

| | | | |
|---|---|---|---|
| 2,691,350 | 10/1954 | Greer | 91/501 |
| 2,953,099 | 9/1960 | Bodzich | 91/506 |
| 2,155,455 | 4/1939 | Thoara | 103/162 |
| 3,202,107 | 8/1965 | Phinney | 103/162 |
| 3,255,638 | 6/1966 | Livers | 103/162 |
| 3,292,554 | 12/1966 | Hessler | 103/173 |
| 3,373,696 | 3/1968 | Geyer | 103/162 |
| 2,699,123 | 1/1955 | Bonnette et al. | 103/162 |
| 2,945,449 | 7/1960 | Le Febure et al. | 130/162 |
| 3,165,892 | 1/1965 | Roberts | 103/162 X |
| 3,173,376 | 3/1965 | Hulman et al. | 103/162 |
| 3,295,457 | 1/1967 | Oram | 103/162 |
| 3,396,670 | 8/1968 | Baits | 103/162 |

FOREIGN PATENTS OR APPLICATIONS

| | | | |
|---|---|---|---|
| 1,529,432 | 5/1968 | France | 91/499 |
| 532,769 | 1/1941 | Great Britain | 103/162 |

*Primary Examiner*—William L. Freeh
*Attorney*—Watson, Cole, Grindle & Watson

[57] ABSTRACT

In a swashplate hydraulic machine each piston is connected by a ball joint to a slipper pad, and actuated by a swashplate assembly comprising a rotary slipper retaining plate rigidly connected to a rotary running plate between which the slipper pads are trapped and can slide, and which are backed up by and mounted to rotate in contact with a stationary cam plate.

3 Claims, 1 Drawing Figure

Patented June 19, 1973 3,739,692
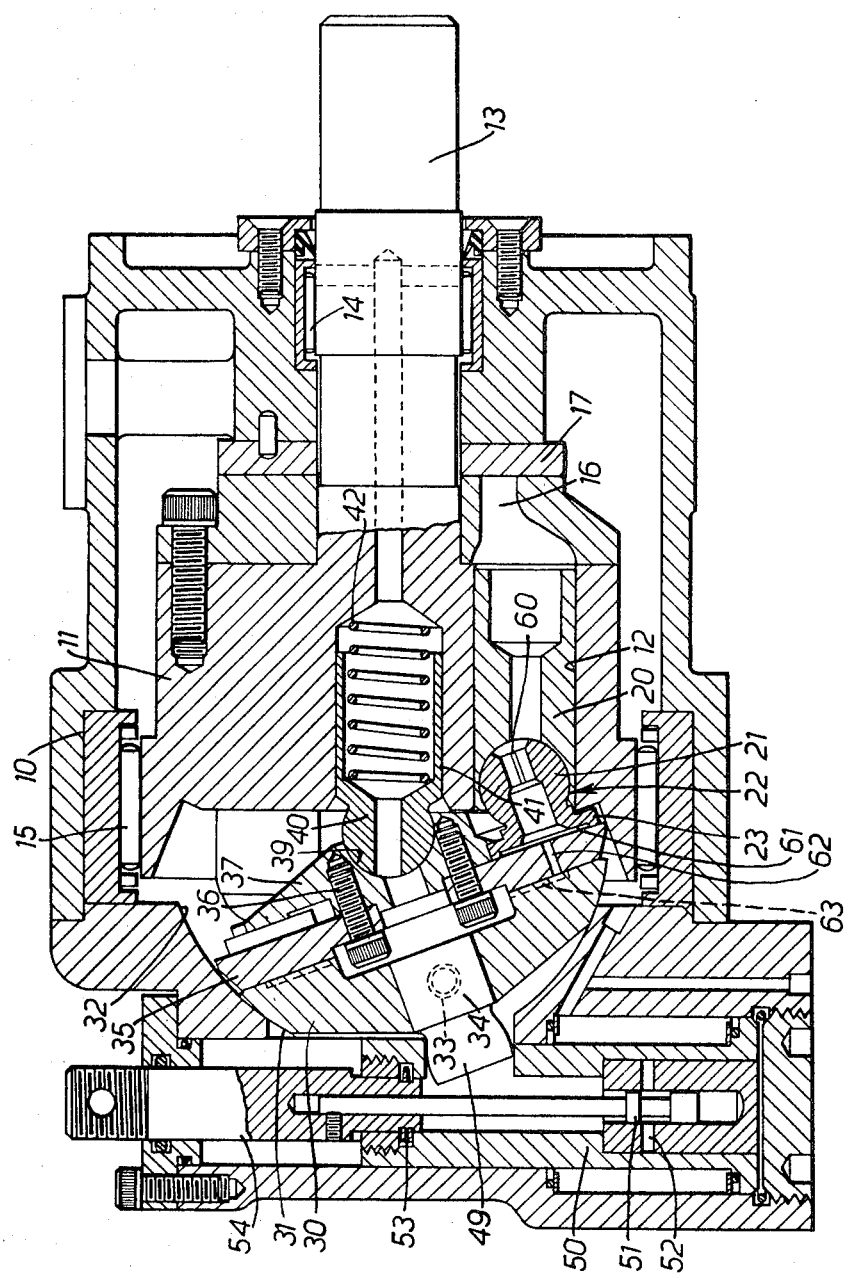
INVENTOR
GEORGE VINCENT BELL
BY
Watson Cole Grindle & Watson
ATTORNEY

SWASHPLATE AND LIKE HYDRAULIC MACHINES

This invention relates to swashplate and like hydraulic machines, the term swashplate being used herein to include wobble plates, cam plates and other equivalent devices.

According to the present invention a swashplate hydraulic machine includes a rotor incorporating a ring of cylinders with their axes substantially parallel to that of the rotor, a piston in each cylinder connected by a ball joint to a slipper pad, and a swashplate assembly having parts which rotate about a stationary swashplate axis inclined at an angle to that of the rotor and co-operative with the slipper pads to impart cyclic movement to the pistons as the rotor rotates, each slipper pad being confined between opposed faces lying perpendicular to the swashplate axis and afforded by rotating parts of the swashplate assembly which are rigidly connected together. Thus the swashplate assembly may comprise a rotary slipper retaining plate rigidly connected to a rotary running plate between which the slipper pads are trapped and can slide, and which are backed up by and mounted to rotate in contact with a stationary cam plate.

It has hitherto been proposed to employ a construction similar to that set forth above except that the slipper pads are confined between a stationary cam plate whose face is normal to an axis inclined to that of the rotor, and a slipper retaining plate rotating about such an axis. The slipper retaining plate is connected by a ball joint to a plunger mounted co-axially in the rotor and urged towards the cam plate by a spring. In operation due to centrifugal and other forces there is a tendency for a slipper pad to tilt, more particularly about an axis perpendicular to a line joining it to the rotor axis, and this tendency is only resisted by a force corresponding to that of the spring, and in some conditions the latter may be at least partly balanced by suction in the cylinders. Unless a very powerful spring is employed, which adds unduly to friction and wear, there is a possibility that under certain conditions, for example of excessive speed or of suction, the slipper pad may tilt sufficiently to escape from the slipper retaining plate and cause serious damage.

The present invention, in which the slipper pad is confined between the slipper retaining plate and a running plate which is rigidly secured to it, offers substantially greater resistance to tilting of the slipper pad in the manner described, and in addition tends to reduce wear since the movement of each slipper pad on the running plate is confined to quite a small orbital path.

The invention may be put into practice in various ways but one specific embodiment will be described by way of example with reference to the accompanying drawing in which the single FIGURE is a central longitudinal section of a hydraulic pump incorporating the invention.

The pump comprises a casing 10 within which is mounted a rotor 11 affording a shaft 13 integral with a cylinder block in which a number of cylinders 12, for example seven, extend parallel to the axis. The rotor is mounted to rotate about its axis in bearings 14 and 15, and at one end, the right as viewed in the drawing, the cylinders have cylinder ports 16 co-operating with inlet and delivery ports in a valve plate 17.

Each cylinder has in it a piston 20, one end of which (to the left as viewed in the drawing) is formed with a part-spherical recess to receive the spherical head 21 of a slipper pad 22 having a disc-like foot 23, adapted to co-operate with a swash plate assembly to impart cyclic movement to the pistons.

The swash plate assembly includes a stationary cam plate 30, a rotating running plate 35, and a rotating slipper retaining plate 37. The cam plate 30 has a part-spherical rear face 31 bearing against a part-spherical recess 32 in the end of the casing, and carries a stub shaft 33 rigidly secured in it as by set screws 34. The rear face of the running plate 35 slides on the flat front face of the cam plate 30, while the feet 23 of the slipper pads bear on the front face of the running plate. The slipper retaining plate 37 is securely bolted to the running plate 35 by bolts 36, and comprises a disc tapering towards its edges and having a slot in its edge to receive each of the slipper pads. Each slot comprises a narrow opening sufficient to allow the neck of the slipper pad to pass into it, after which it widens out so as to permit a circular orbital movement of the slipper pad relative to the retaining plate. Thus each slipper pad is confined against movement parallel to the swashplate axis between the front face of the running plate and the rear face of the retaining plate, but is free to execute circular orbital movement relative to them. Since the retaining plate is securely bolted to the running plate tilting of the slipper pad is positively prevented.

At its center the retaining plate is provided with a part-spherical recess 39 receiving the ball-shaped end 40 of a plunger 41 mounted in a co-axial recess in the end of the rotor and urged by a spring 42 towards the swash plate assembly. This centers the retaining plate and running plate. In addition, the spring 42, acting through the ball 40, holds the cam plate in contact with the part-spherical recess 32 of the casing, but it is not relied upon to prevent tilting of the slipper pads 22 due to centrifugal or other forces. Accordingly the spring 42 can be quite light and will add little friction and wear.

The stub shaft 33 has a part-spherical end 49 received in an opening of a servo piston 50 by which the inclination of the swashplate assembly can be adjusted as required so as to vary the delivery of the pump. The servo piston contains a movable valve member 51 co-operating with ports 52 so as to cause the piston to follow the movement of the valve member. Such structure is of conventional construction and it is therefore unnecessary to describe it in detail. Briefly, the annular upper face of the servo piston is permanently connected by an oblique passage 65 to a space at delivery pressure so as to bias the piston downwards, and through a port 52, only partially shown, to a bore in the piston which contains a movable valve member 51. The latter cooperates with, and in its normal position covers, a port (not shown) communicating with the lower face of the piston. Thus, if the valve moves up relatively to the piston, this lower face is subjected to delivery pressure which overcomes the pressure on the smaller annular upper face and raises the piston, whereas if the valve moves down relatively to the piston, the lower face is subjected to the inlet pressure prevailing above the piston, and the pressure on the annular upper face lowers the piston. Thus the piston is caused to follow the movement of the valve member.

It is, however, to be noted that a centering spring 53 is connected between the piston and an actuating member 54 secured to the valve member 51. This spring is of helical form received partly in a groove between two shoulders of the actuating member and partly between shoulders afforded by the piston, so as to oppose and restrict relative movement between the valve and piston in either direction.

This feature is of some importance since the pressure for actuating the servo piston is derived from the pump itself, so that when the pump is in a neutral position giving zero delivery there may be no pressure available to actuate the servo piston. At this time there is substantially no resistance to adjusting movement of the swashplate assembly and accordingly movement of the actuating member comprises the centering spring, causing movement of the servo piston and with it the cam plate to a sufficient extent to cause some delivery to the pump, to build up the pressure and cause the servo device to function in the normal manner.

In order to reduce friction and wear each slipper pad has in it a passage 60 leading from the cylinder to a shallow recess 61 in the face of the foot sliding on the running plate. Similarly in register with each recess 61 the running plate has a hole 62 extending through it and opening into a pair of shallow arcuate recesses 63 in the cam plate. In this way the pressure between the slipper pads and the running plate and between the running plate and the cam plate is taken largely by the liquid, thereby reducing friction and wear.

What I claim as my invention and desire to secure by Letters Patent is:

1. A swashplate hydraulic machine, comprising: a rotor including a ring of cylinders having axes substantially parallel to the axis of rotation of said rotor, each cylinder including a piston connected to a disc-shaped slipper pad by a ball joint, a swashplate assembly rotatable about a stationary swashplate axis inclined at an angle to the axis of rotation of said rotor and engaging with said slipper pads to impart cyclic movement to said pistons as said rotor rotates, said swashplate assembly including a running plate having front and rear surfaces and a slipper retaining plate mounted to rotate about said swashplate axis, means for rigidly securing said running plate to said slipper retaining plate to prevent relative axial and rotative movement between them both, each said slipper pad is slidably retained between said running plate front surface and an opposed surface of said slipper retaining plate to positively prevent each slipper pad from tilting with respect to said swashplate axis, and a stationary cam plate in contact with said running plate rear surface.

2. A swashplate hydraulic machine as in claim 1 wherein each of said slipper pads has a pressure balancing recess in its surface opposing said running plate front surface and a passage extending from the associated cylinder to said pressure balancing recess, said stationary cam plate has pairs of arcuate recesses in its surface contacting said running plate, said running plate has holes each interconnecting the respective one of said pressure balancing recesses with a respective one of said pairs of arcuate recesses to enable a liquid to be forced between said slipper pads and said retaining plate front surface, and wherein the alignment of said pressure balancing recesses and said holes is maintained by said means for rigidly securing said running plate to said slipper retaining plate, whereby the forces exerted by said pistons on said slipper pads and the front surface of said retaining plate are reduced by said liquid.

3. A machine as claimed in claim 1 wherein said machine further comprises a fixed surface and in which the face of the cam plate remote from the running plate includes a surface of revolution about a transverse axis engaging said fixed surface to permit adjustment of the inclination of the swashplate axis.

* * * * *